United States Patent
Goodson et al.

[11] Patent Number: 5,823,024
[45] Date of Patent: Oct. 20, 1998

[54] APPARATUS FOR DISABLING THE STEERING OF A VEHICLE

[75] Inventors: Doris L. Goodson, Camden; Alexander Alon, Mays Landing, both of N.J.

[73] Assignees: Doris Goodson, Camden; Elizabeth Stewart, Mt. Laurel, both of N.J.

[21] Appl. No.: 733,503

[22] Filed: Oct. 18, 1996

[51] Int. Cl.$^6$ .................................................. B60R 25/02
[52] U.S. Cl. .............................................. 70/218; 70/252
[58] Field of Search ........................... 70/209, 218, 220, 70/221–224, 252

[56] References Cited

U.S. PATENT DOCUMENTS

| | | | |
|---|---|---|---|
| 1,282,121 | 10/1918 | Perry . | |
| 1,315,261 | 9/1919 | Vincent | 70/218 |
| 1,359,921 | 11/1920 | Vanderlip | 70/218 X |
| 1,360,616 | 11/1920 | Borck | 70/218 X |
| 1,403,660 | 1/1922 | Weaver | 70/209 |
| 1,444,977 | 2/1923 | Manlet | 70/221 |
| 1,454,233 | 8/1923 | Graebert | 70/223 |
| 1,496,861 | 6/1924 | Murphey . | |
| 1,502,020 | 7/1924 | Danziger . | |
| 1,592,630 | 7/1926 | Ganz | 70/221 |
| 1,598,494 | 8/1926 | Murphey . | |
| 1,598,623 | 8/1926 | Smyser | 70/223 |
| 1,608,593 | 11/1926 | Gillett | 70/223 X |
| 3,659,444 | 5/1972 | Wellekens | 70/360 |
| 3,896,645 | 7/1975 | Nagy et al. | 70/149 |
| 4,881,389 | 11/1989 | Alfon et al. | 70/209 |
| 4,887,484 | 12/1989 | Peng | 74/556 |
| 4,901,544 | 2/1990 | Jang | 70/218 |
| 4,924,685 | 5/1990 | Usina | 70/218 |
| 4,934,479 | 6/1990 | Usina | 70/252 X |
| 5,180,029 | 1/1993 | Rosenlund | 70/252 X |
| 5,216,908 | 6/1993 | Malvy | 70/221 X |
| 5,345,797 | 9/1994 | Hayes | 70/218 |

*Primary Examiner*—Suzanne Dino
*Attorney, Agent, or Firm*—Thomas A. Lennox; James J. Murtha

[57] ABSTRACT

An apparatus for rotatably mounting a steering wheel to a steering column is provided. A core having a central bore is attached to the steering column. A housing is rotatably mounted to the core. A steering wheel is fixed to the housing. A central shaft extends away from the housing through the bore. A locking assembly is mounted to the housing which can be selectively engaged to the core such that, in an unlocked position, the housing can rotate with respect to the core and, in the locked position, the housing is fixed with respect to the core.

An apparatus is provided for mounting a steering wheel to a steering column such that the steering wheel can be selectively disabled. A core is attached to the steering column. A track is located at the periphery of the core. A slot in the core extends from the track. A housing is fixedly attached to the steering wheel and rotatably mounted to the core. A lock assembly is mounted to the core having an end located on the track. A tab mounted to the end of the lock assembly is disposed within the housing. The tab is selectively engaged to the slot and wherein, when the tab is engaged to the slot, the housing is fixed with respect to the core.

20 Claims, 2 Drawing Sheets

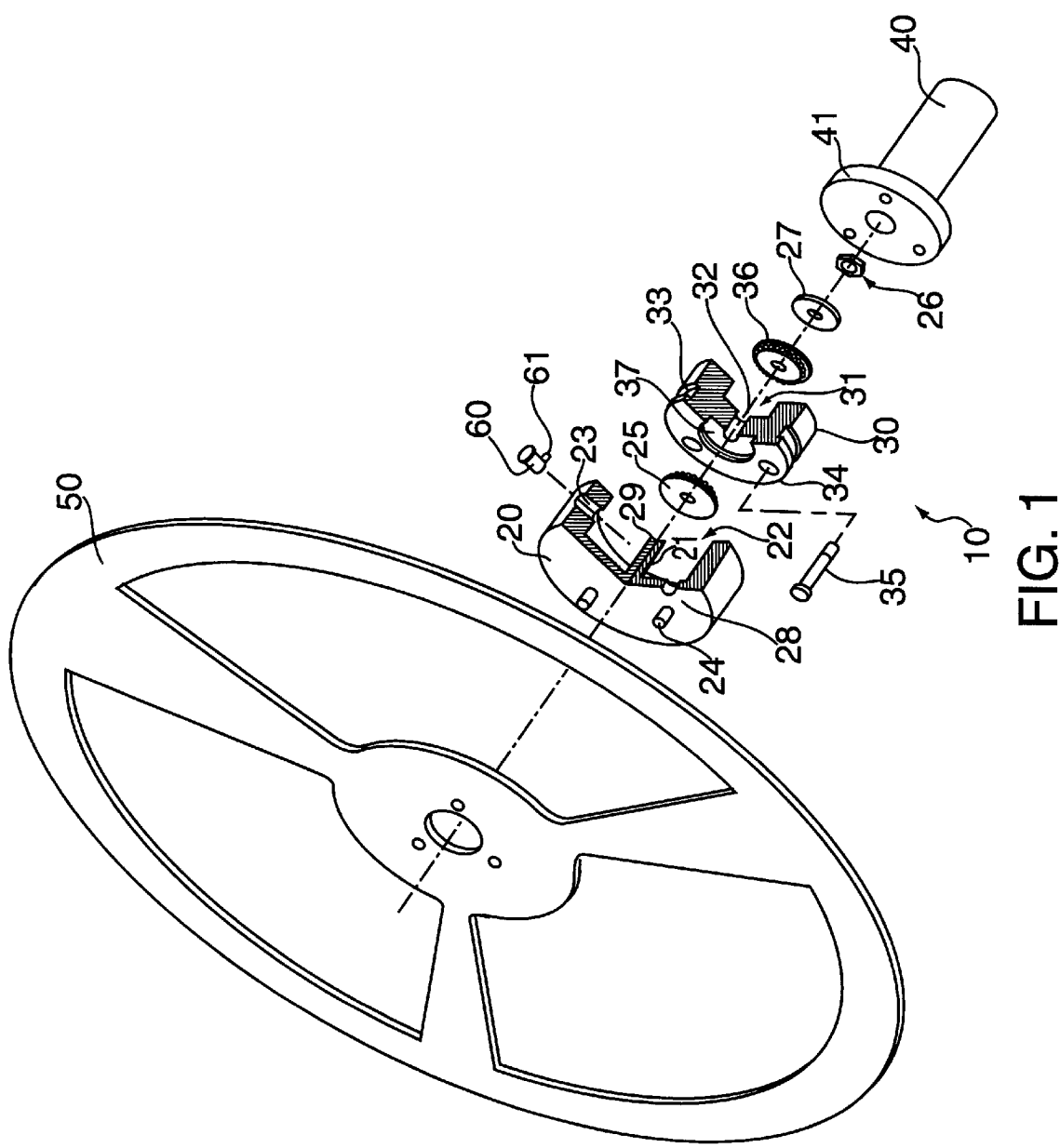

APPARATUS FOR DISABLING THE STEERING OF A VEHICLE

BACKGROUND OF THE INVENTION

This invention is directed to the field of vehicle anti-theft devices. In particular, the invention is directed to an apparatus for disabling the steering wheel of a vehicle such that, in an unlocked position, it is free spinning, thereby disabling the vehicle.

Vehicle theft has long been a significant concern of car and truck owners. Due to the nature and size of vehicles, they are often left unattended in public places. Thieves break into parked vehicles, force the ignition lock and drive the car away to be sold whole or broken into parts for resale.

Recently, devices have been developed to make steering a vehicle difficult or impossible without unlocking a separate lock. For example, one product, marketed under the trademark, THE CLUB®, is a rigid bar that attaches to a steering wheel and is locked in place. To steer the car, the bar must be removed, either by opening the lock or by cutting the steering wheel. This increased difficulty in stealing the vehicle is believed to deter would-be thieves. However, steering wheels are easily cut, permitting quick removal of the device. Further, such devices can be heavy and clumsy to remove.

SUMMARY OF INVENTION

It is an object of the present invention to provide an apparatus that disables the steering mechanism of a vehicle unless a separate lock is engaged. It is a further object of the invention to provide an apparatus that will deter vehicle thieves from attempting to steal the vehicle and which can be easily installed as the vehicle is manufactured or as an aftermarket add-on. It is a further object of the invention to provide an apparatus which will easily render a vehicle undriveable without the need for special, clumsy attachments but permit the driver to quickly and easily render the car driveable.

In accord with one aspect of the invention, an apparatus for rotatably mounting a steering wheel to a steering column is provided. A core is rigidly attached to the steering column. The core has a central bore. A housing is rotatably mounted to the core. A steering wheel is fixedly mounted to the housing. A central shaft is fixedly mounted to the housing and extends away from the housing through the bore. A locking assembly is mounted to the housing which can be selectively engaged to the core such that, in an unlocked position, the housing can rotate with respect to the core and, in the locked position, the housing is fixed with respect to the core.

Certain implementations of this aspect of the invention provide that: a bearing cavity is disposed in the core and that the apparatus further comprises a core bearing disposed in the bearing cavity between the core and the steering column; a chamber is disposed in the housing and the core is disposed, at least in part, within the chamber, the apparatus further comprising a housing bearing disposed in the chamber between the housing and the core; the housing has a cylindrical shape and the locking assembly extends radially through the housing; wherein the central shaft includes a threaded portion located on the central shaft at an end distal to the housing, the apparatus further comprising a stopper engaged to the threaded portion such that the core is positioned between the stopper and the housing.

In accord with another aspect of the invention, an apparatus for disabling the steering of a vehicle is provided. A cylindrical core is fixedly mounted to a steering column. A bearing cavity is disposed in the core adjacent to the steering column. A bore extends axially through the core. A housing has a cylindrical chamber in which the core is disposed, at least in part. A central shaft is mounted to the housing and extends axially through the bore. A stopper is attached to an end of the central shaft distal to the housing. A core bearing is mounted to the central shaft between the stopper and the core. A housing bearing is mounted to the central shaft between the housing and the core. A locking assembly is fixedly mounted to the housing and selectively engaged to the core.

Certain implimentations of this aspect of the invention provide that: a tab is mounted to a free end of the locking assembly which extends into the chamber, the apparatus further comprising a track disposed along the periphery of the core in which the free end is seated and a slot disposed along the track for selectively receiving the tab in mating engagement; a lock cavity extends radially through the housing, wherein the locking assembly is disposed in the lock cavity, and further comprising a lock clip attached to the housing, maintaining the locking assembly in the lock cavity.

Another aspect of the invention provides an apparatus for mounting a steering wheel to a steering column such that the steering wheel can be selectively disabled. A core is fixedly attached to the steering column. A track is located at the periphery of the core, and a slot is disposed in the core extending from the track. A housing is fixedly attached to the steering wheel and rotatably mounted to the core. A lock assembly is mounted to the core having an end located on the track. A tab is mounted to the end of the lock assembly for rotational movement, which tab is selectively rotated into engagement with the core and wherein, when the tab is engaged to the core, the housing is fixed with respect to the core.

Certain implementations of this aspect of the invention provide that: a central shaft is mounted to the housing and a bore is located in the core, wherein the central shaft is disposed in the bore; a housing bearing is disposed on the central shaft between the core and the housing; a stopper is mounted to the central shaft distal to the housing such that the core is located between the housing and the stopper; the stopper comprises a nut threaded onto the central shaft and further comprising a core bearing mounted to the central shaft between the nut and the core.

BRIEF DESCRIPTION OF THE DRAWINGS

FIG. 1 is a front perspective exploded view, in partial cut-away, of an anti-theft apparatus in accord with an aspect of the invention.

FIG. 2 is an isolation plan view of a lock clip for use with the apparatus of FIG. 1.

DESCRIPTION OF PREFERRED EMBODIMENTS

Figure 3:
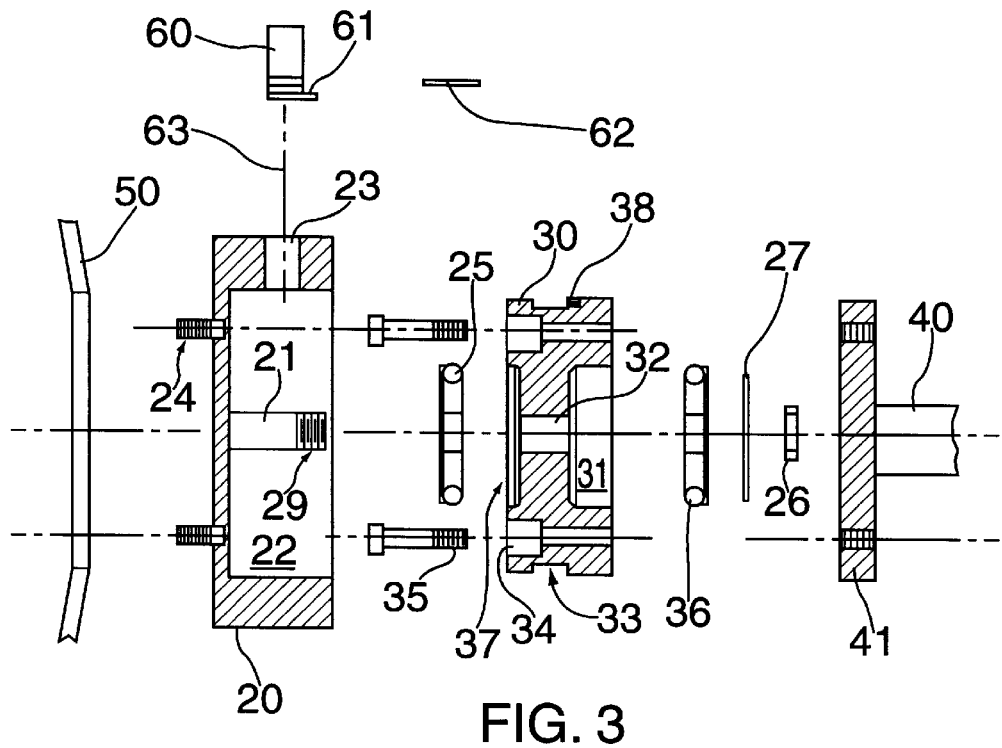
FIG. 3 is a cutaway side exploded view of the apparatus of FIG. 1.
Figure 4:
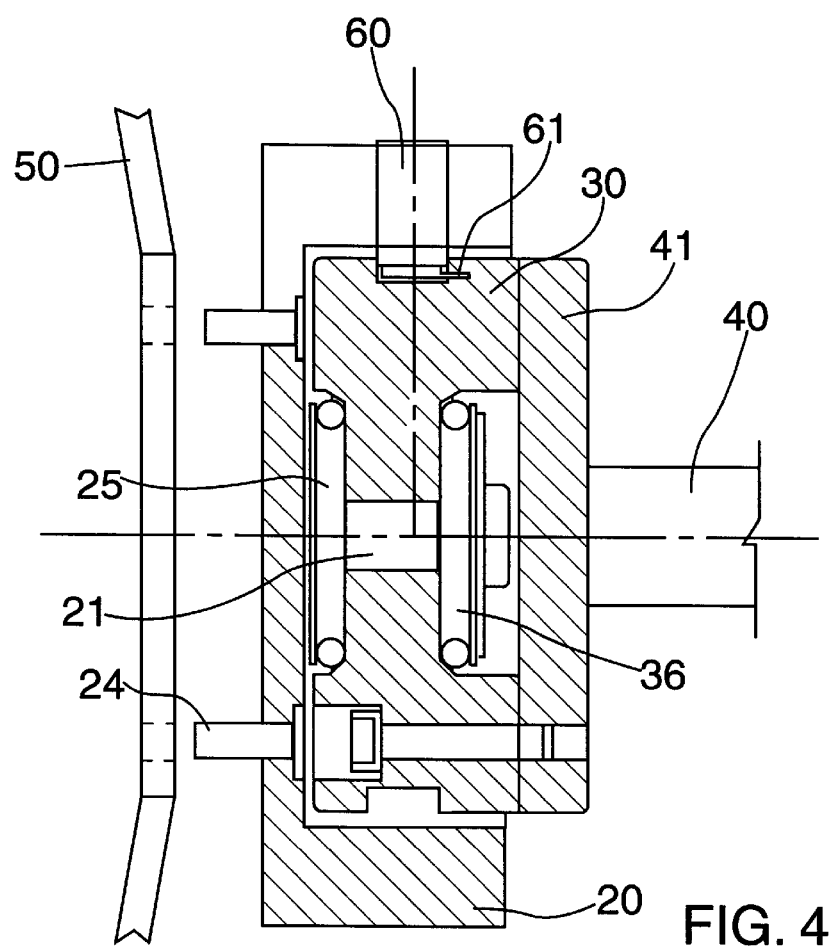
FIG. 4 is a cutaway side view of the apparatus of FIG. 1 assembled in a locked condition.

Referring to drawings, an apparatus 10 for disabling a steering wheel of a vehicle is provided in accord with one aspect of the invention. A steering column 40 is operably engaged to the wheels of a vehicle in any way known in the art. The apparatus of the current invention acts as a connection between the steering wheel 50 and the steering column. When the apparatus is locked, the steering column is fixed with respect to the steering wheel, such that turning the steering wheel turns the steering column as in any traditional steering assembly. When the apparatus is unlocked, the steering wheel spins freely with respect to the steering column, rendering the vehicle unsteerable and thus undriveable.

A core 30, which has a substantially cylindrical shape, is fixedly attached to the steering column 40 by bolts 35. The bolts are positioned in cavities 34 and engaged to a flange 41 on the steering column. Of course, the core may be attached to the steering column in any way known in the art.

A central bore 32 is disposed axially in the core 30. An enlarged bearing cavity 31 is disposed axially in the core on the side of the core adjacent the flange 41. A track 33, which is an annular groove, is disposed about the periphery of the core. A slot 38 is disposed in the core, extending from the track parallel to the axis of the core. A circular indenture 37 (which functions as a bearing cavity) is positioned concentrically on the face of the core distal to the flange.

A housing 20, having a substantially cylindrical shape, is fixedly mounted to the steering wheel 50 by bolts 24. The bolts are attached to the housing by pressing the bolt heads into cavities, welding or other such acceptable methods. A chamber 22, which is preferably cylindrical, is disposed in the housing in the side distal to the steering wheel. A central shaft 21 is mounted axially to the housing and extends through the chamber. Preferably, the central shaft and the housing are integrally formed. The portion 29 of the central shaft distal to the housing is threaded. A cylindrical lock cavity 23 is disposed radially in the housing.

A lock assembly 60 is seated in the lock cavity 23. Preferably, the lock assembly has a cylindrical casing to match the shape of the lock cavity, such as a heavy duty cylindrical lock marketed by Bestlock. Of course, other such locks would also be acceptable. Further, the lock may have any shape that fits snugly into the lock cavity such that the lock does not rotate within the cavity.

A lock clip 62 having a horseshoe-shape (see FIG. 2) maintains the lock assembly in the lock cavity. A free end of the lock assembly extends into the housing 20 and is seated in the track 33. A tab 61 extends radially from the end of the lock assembly in the track. The key slot (not shown) is positioned on the other end of the lock assembly, exterior to the housing. In operation, as the key is turned in the key slot, the tab rotates about the axis 63 of the lock assembly engaging or disengaging the slot 38.

To assemble the apparatus 10, bolts 35 are inserted into the bolt holes 34. The housing bearing 25 is seated in the circular indenture 37, bearing side facing the core. The lock assembly 60 is inserted into the lock cavity 23. The central shaft 21 is inserted into the housing bearing and the bore 32 of the core 30. The lock clip 62 is inserted between the core and the housing about the lock assembly. A core bearing 36 is slipped over the end of the central shaft extending out of the bore, bearing side facing the core. A washer 27 is also slipped over the central shaft. A stopper, such as a nut 26, is engaged to the threaded portion 29 of the central shaft, maintaining the core bearings and washer in place. The bolts 35 are then aligned with holes in the flange 41. The housing is rotated until an access hole 28 is aligned with a head of one of the bolts 34. A tool is inserted into the access hole to tighten the bolts into the holes in the flange. This is repeated until all the bolts are tightened onto the flange. The steering wheel is then attached onto the housing using bolts 24 or other attachment means.

To operate the apparatus of the current invention, the driver inserts a key into the key slot. As the key is turned, the lock cylinder of the lock assembly turns, causing the tab 61 to rotate about the lock assembly axis 63 and into the slot 38, engaging the tab to the slot. The steering wheel 60 may need to be rotated (causing the housing 20 to rotate) until the tab is aligned with the slot before the key can be completely turned. Once the tab is engaged to the slot, the housing and the core are connected such that they rotate together. The vehicle may now be driven.

One advantageous feature of this arrangement is that the tab 61 does not engage the slot 38 with a radial movement into the core 30. Rather, the tab rotates along an axis 63 that extends radial with respect to the core. The anti-theft device of the instant invention thus cannot be defeated by jamming a shive, such as a screw driver, into the lock assembly.

To disable the steering wheel 60, the driver inserts the key into the key slot, turning the key again. The tab 61 is rotated out of engagement with the slot 38. The tab is now positioned in the track 33. Consequently, the housing (and thus the steering wheel) rotates freely about the core, disabling the steering wheel. The use of both a housing bearing 25 and a core bearing 36 insures that the steering wheel 50 spins feely with respect to the steering column 40 such that friction cannot cause the steering wheel to move the steering column.

While this invention has been described with reference to specific embodiments disclosed herein, it is not confined to the details set forth and the patent is intended to include modifications and changes which may come within and extend from the following claims.

We claim:

1. An apparatus for disabling the steering of a vehicle comprising;

a steering column;

a cylindrical core fixedly mounted to the steering column wherein a bearing cavity is disposed in the core adjacent to the steering column and a bore extends axially through the core;

a circumferential track extending completely around the core;

a cylindrical housing having a cylindrical chamber, wherein the core is disposed, at least in part, within the chamber;

a central shaft fixedly mounted to the housing and extending axially through the bore;

a stopper attached to an end of the central shaft distal to the housing;

a core bearing mounted to the central shaft between the stopper and the core;

a housing bearing mounted to the central shaft between the housing and the core; and a locking assembly fixedly mounted to the housing, contained completely within the housing and selectively engaged to the core wherein the locking assembly comprises a free end permanently disposed in the track.

2. The apparatus of claim 1 further comprising a tab mounted to the free end of the locking assembly wherein a single slot is disposed in the core along the track and contiguous with the track for selectively receiving the tab in mating engagement.

3. The apparatus of claim 2 further comprising a lock cavity extending radially through the housing, wherein the locking assembly is disposed in the lock cavity, and further comprising a lock clip attached to the housing, maintaining the locking assembly in the lock cavity.

4. The apparatus of claim 3 wherein the housing and the central shaft are integrally formed.

5. The apparatus of claim 1 wherein the circumferential track has a rectangular cross section and wherein the cylindrical core is contained completely within the chamber of the housing.

6. An apparatus for mounting a steering wheel to a steering column such that the steering wheel can be selectively disabled comprising:
   a core fixedly attached to the steering column, the core having a periphery;
   a circular track disposed about the complete periphery of the core;
   a cylindrical housing fixedly attached to the steering wheel and rotatably mounted to the core;
   a lock assembly mounted completely within the housing and extending radially toward the core, the lock assembly having an end disposed permanently in the track; and
   a tab mounted to the end of the lock assembly, for rotational movement about a radial axis, which tab is selectively rotated into engagement with the core and wherein, when the tab is engaged to the core, the housing is fixed with respect to the core.

7. The apparatus of claim 6 wherein a single slot is disposed in the core contiguous with the track, and wherein the tab is seated in the slot when the tab is engaged to the core.

8. The apparatus of claim 6 further comprising a central shaft mounted to the housing and a bore located in the core, wherein the central shaft is disposed in the bore.

9. The apparatus of claim 8 further comprising a housing bearing disposed on the central shaft between the core and the housing.

10. The apparatus of claim 8 further comprising a stopper mounted to the central shaft distal to the housing such that the core is located between the housing and the stopper.

11. The apparatus of claim 8 wherein the stopper comprises a nut threaded onto the central shaft and further comprising a core bearing mounted to the central shaft between the nut and the core.

12. The apparatus of claim 6 wherein the circular track has a rectangular cross section and the tab is a flat plate.

13. An apparatus for rotatably mounting a steering wheel to a steering column comprising:
   a core rigidly attached to the steering column having a central bore;
   a circumferential track disposed completely about the core;
   a housing rotatably mounted to the core, wherein the core is contained completely within a chamber in the housing;
   a steering wheel fixedly mounted to the housing;
   a central shaft fixedly mounted to the housing and extending away from the steering wheel through the central bore of the core; and
   a locking assembly mounted to the housing having a free end continuously disposed in the circumferential track which can be selectively engaged to the core such that, in an unlocked position, the housing can rotate with respect to the core and, in the locked position, the housing is fixed with respect to the core.

14. The apparatus of claim 13 wherein a bearing cavity is disposed in the core, the apparatus further comprising a core bearing disposed in a bearing cavity between the core and the steering column.

15. The apparatus of claim 14 further comprising a housing bearing disposed in the chamber between the housing and the core.

16. The apparatus of claim 13 wherein the housing has a cylindrical shape, a plate-shaped tab is mounted to the free end of the locking assembly, and a single slot is disposed in the housing contiguous with the track and wherein, in the locked position, the tab is rotated into the single slot and, in the unlocked position, the tab is positioned in the track.

17. The apparatus of claim 16 wherein the locking assembly engages the core by rotating about the axis of the locking assembly.

18. The apparatus of claim 13 wherein the central shaft includes a threaded portion located on the central shaft at an end distal to the housing further comprising a stopper engaged to the threaded portion such that the core is positioned between the stopper and the housing.

19. The apparatus of claim 13 further comprising a flat tab mounted to the free end of the locking assembly.

20. The apparatus of claim 19 wherein the circumferential track has a rectangular cross section.

* * * * *